July 29, 1930.  G. B. MUSTIN  1,771,981
CHEWING GUM AND METHOD OF MAKING SAME
Filed Sept. 10, 1928
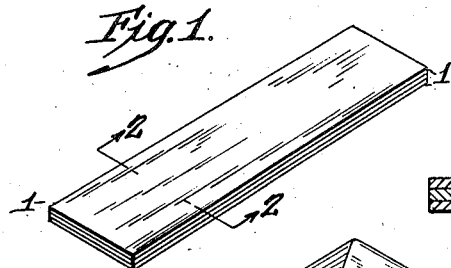
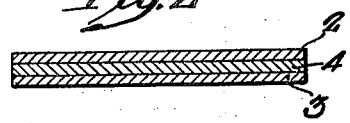
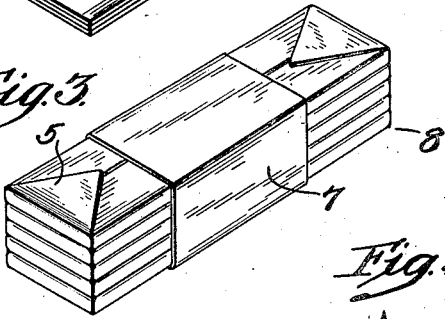
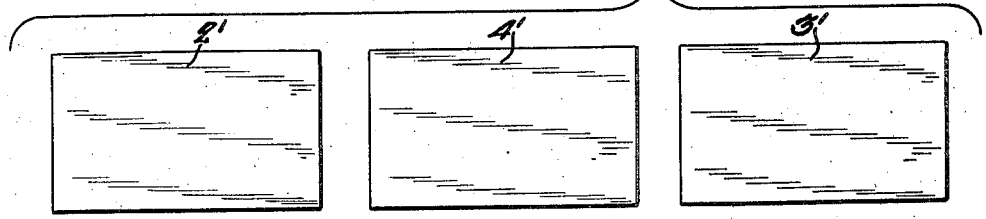
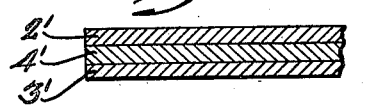
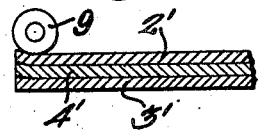
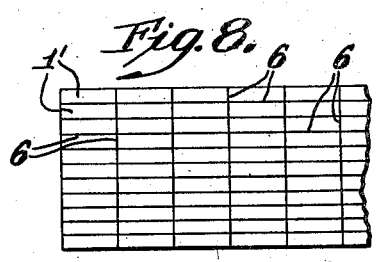
Inventor:
Gilbert B. Mustin
by Alston B. Moulton
Attorney.

Patented July 29, 1930

1,771,981

UNITED STATES PATENT OFFICE

GILBERT B. MUSTIN, OF LANSDOWNE, PENNSYLVANIA

CHEWING GUM AND METHOD OF MAKING SAME

Application filed September 10, 1928. Serial No. 304,934.

Heretofore difficulty has been experienced in making a chewing gum strong in flavor and pleasant in taste. This is because the gum material does not take up or absorb very much of the flavoring material. The masticable material or "chew" is, generally speaking, a non-absorbent material into which sufficient flavor can be incorporated only by using a concentration considerably higher and a quantity several times as great as that which would be used by a confectioner in flavoring a sugar confection with the same flavor.

Nor can the quality of the flavor of chewing gum be substantially increased or improved by increasing the concentration or the quantity of flavoring material over that which is ordinarily used in making a commercial chewing gum, for the organs of taste are unaccustomed to these stronger and more concentrated flavors and the consumer of such a gum might not recognize the flavor or might find it unpleasant.

Moreover, while the insoluble masticable content of chewing gum is nearly tasteless, it does in fact possess a perceptible taste and the taste of the flavoring extract or solution mingled with the natural taste of the substantially insoluble portion of the gum is substantially different from that usually associated with the particular flavor, because the gum chewer voluntarily or involuntarily compares the taste of the flavor of the gum to that produced by that flavor on sugar or in confectionery.

Sugar will absorb and retain almost any flavor and confectionery so flavored will be promptly recognized as having the flavor which the chewer regards as the true flavor, although to impart that flavor to the confectionery, a relatively smaller proportion of a lower concentration of the flavoring material will be required than a gum manufacturer will need to impart a much less pronounced flavor to the masticable portion of chewing gum.

The flavors which can be employed in flavoring chewing gum and which taste in chewing gum substantially as they taste in confectionery, but weaker or milder, and which are popular with users of chewing gum, are very few. They are peppermint and spearmint, with wintergreen occupying a considerably lower third place in popular flavor.

In the ordinary manufacture of chewing gum, the proportion of insoluble gum content varies from substantially 18% to substantially 30% of the volume of the gum and the actual content of sugar in a single strip or bar of chewing gum, and by which substantially all the flavor is retained in the gum, is relatively small. Moreover, the ordinary chewing gum is quite hydroscopic, causing the gum to "sweat" unless the piece of gum is carefully protected from contact with the atmosphere by a tinfoil or waterproof paper or both. On the other hand, confectioneries made of sugar, and of the lozenge type of confectioneries, are not hydroscopic or deliquescent, but are dry and normally brittle, and will long retain their flavors when exposed directly to the air.

With these considerations in mind, it is an object of this invention to provide individual pieces of chewing gum, preferably in the form usually found on the markets, namely thin rectangular strips of approximately 2⅝ x ¾ x 3/32 inches in size, each piece comprising a thin core of masticable gum having its opposite sides provided with a surfacing, coating, ply or layer of normally brittle lozenge confection, which will retain almost any flavor, indefinitely, so that when my new strip or bar of gum, is masticated, it will have the natural full taste which is always associated with the flavor when it is tasted in confectionery or on sugar.

A further object of my invention is to prevent the hydroscopic insoluble contents of a strip of chewing gum from atmospheric contact, by providing the opposite flat surfaces thereof respectively with a thin layer or ply or coating of smooth, non-gritty, non-crystalline lozenge or similar confectionery containing any desired flavor.

A further object of my invention is to produce a three-ply strip or bar of chewing gum comprising a thin sheet or bar of masticable gum placed between two layers of a lozenge confection, the composite strip or bar being of substantially the same size as that present in ordinary chewing gum now on the market, and being capable of being packaged in the same manner as is ordinary chewing gum that is to say, five thin flat strips or bars bundled flat in a package, each bar being separately wrapped if desired with a protective wrapper.

A further object of my invention is to provide a three-ply strip or bar of chewing gum of the size of the ordinary one-ply strip of chewing gum and which shall contain substantially the same quantity of insoluble content or "chew" in each thin intermediate masticable strip as that which is now contained in the said ordinary strip of chewing gum of the size of my said improved three-ply bar.

Referring to the drawings forming a part of this specification and in which the same reference characters are employed throughout the various views to designate the same parts, Fig. 1 is a perspective view of a strip or bar of my improved chewing gum made in accordance with this invention, the thicknesses of the plies being somewhat exaggerated for the sake of clearness.

Fig. 2 is a transverse cross-sectional view on a slightly larger scale of the strip or bar of chewing gum shown in Fig. 1.

Fig. 3 is a perspective view of a package of five strips or bars of chewing gum, each wrapped in its individual wrapper, and the whole five bound together flat by an outer binder or wrapper in the manner in which ordinary chewing gum is packaged for sale.

Fig. 4 is a diagrammatic view of two relatively thick batches of lozenge dough and one batch of masticable material, such as ordinary chewing gum, rolled out into three relatively thick sheets.

Fig. 5 is a fragmentary vertical cross-sectional view on an exaggerated scale, of fragments of the three sheets shown in Fig. 4, superposed with the thick sheet of masticable material between the two thick sheets of lozenge dough.

Figs. 6 and 7 indicate, also diagrammatically, the manner in which the three plies of these thick composite sheets are reduced in thickness by a rolling action, and Fig. 8 is a diagrammatic plan view of a portion of the final sheet of plastic, ductile material, or base sheet shown in Figs. 4 to 7, rolled down to the thickness of the finished strip or piece of gum and scored so as to make possible the easy separation of the small individual sticks or strips of my chewing gum from the sheet, when the sheet is cool.

My improved stick or bar 1 of chewing gum is preferably composed of three plies or layers of material, permanently united together. The outer plies 2 and 3 are preferably composed of a sugar confection or confectionery, known as lozenge confection which is normally brittle when dry and the intermediate ply 4 is preferably made of chewing gum composed, generally speaking, of the same ingredients that are usually employed in the making of any good quality or grade of chewing gum. The plies or layers 2 and 3 are firmly and unitarily united to or joined with the intermediate ply 4 so that each outside ply or layer forms an inseparable part of the finished stick or strip 1 of chewing gum.

In making my new and improved stick or strip 1 of chewing gum, I prepare a plastic mass or loaf of chewing gum in the usual way, except that I preferably substantially increase the insoluble content of the mass of chewing gum, over that employed in the manufacture of ordinary gum to a point at which the "chew" remaining in the mouth after the soluble ingredients have been dissolved by mastication, is not very much less in volume than that left in the mouth after a piece of ordinary chewing gum of the same size as my composite bar has been masticated.

I proceed by preparing a plastic or ductile batch or loaf of chewing gum as above described and preferably flavored with a selected flavor in the ordinary way and I also, at substantially the same time, prepare a batch of plastic lozenge dough, preferably flavored with the same flavor as that of the batch of chewing gum. I then roll these batches out separately, warm into three relatively thick sheets 2', 3', 4' of say one-eighth of an inch or more in thickness, that being very much thicker than the plies will be in my finished product.

I then preferably place the thick, warm sheet 4' of the masticable material upon a thick warm sheet 3' of the lozenge dough and I next place a thick warm sheet 2' upon the sheet 4' and then carefully roll out the warm composite sheet, thinner and thinner, with any suitable rolling device 9, as indicated in Figs. 6 and 7, until the thickness of the composite sheet is substantially $\frac{3}{32}$ of an inch, which is substantially the thickness of a strip or bar of ordinary chewing gum.

After this composite or base sheet is thus formed, it is preferably provided with deep scoring lines 6 in the usual manner to divide the sheet into a large number of individual sticks or strips 1' of chewing gum of substantially the size and shape of strips of ordinary chewing gum, but preferably held together at the scoring by a thin web.

The composite sheet thus formed is then put aside and allowed to cool. When cool, the small rectangular strips or bars 1 of gum are readily snapped away from the scored sheet at the scoring and they may then be wrapped each in a cover 5 of paper or any other suitable material and packaged in packages 8 of five strips, with a paper band or cover 7 holding the package 8 together in the usual manner.

Since the ductility of the materials of these three sheets 2′, 3′, 4′ is substantially the same, at the temperature at which they are rolled out into the thin composite sheet, the thickness of the three plies 2′, 3′, 4′, will be reduced substantially alike by this rolling step. The proportions of thicknesses of the layers to each other in the thick composite will be substantially retained in the finished large thin composite sheet and in the finished bars or strips 1 of chewing gum made therefrom. At the same time, the soft ductile layers or 2′, 3′, of lozenge dough are permanently inseparably united to the opposite surfaces of the intermediate sheet or layer 4′ of masticable material.

The lozenge material which I preferably use is, generally speaking, like that ordinarily used by confectionery makers for making normally brittle peppermint, wintergreen and similar lozenges. The consistency at which I use this material is practically that of a dough. It is not fluid but it is moldable and ductile and may be rolled into thin sheets. Its ductility is not substantially changed by ordinary variations in temperature between 85° F. and 150° F. and I maintain the temperature of the sheet of chewing gum at a point where the ductility or stretch or property of stretching and spreading of the gum material forming the intermediate layer 4′ substantially matches that of the layers 2′—3′ of the confectionery dough.

By reason of the intimate contact between the layers 2′ and 3′ of dough of lozenge composition and the layer 4′ of plastic masticable material, the outer plies or layers 2′ and 3′ appear to absorb a little of the moisture and of the gummy material composing the masticable layer 4′ and the outer coatings 2, 3 of the finished product are not rigid and brittle, as they are in ordinary lozenges, but are slightly flexible, so that when a piece 1 of my improved gum is bitten or broken off, the outer layers or coatings 2 and 3 are severed or broken at the same place that the core 4 is severed or broken. This change in the character of the lozenge material is probably due, in part, to the fact that the plasticity of the two materials is substantially the same, and that the two materials are mixed and forced slightly one into the other at their plane of juncture under the rolling action. The coatings 2 and 3 will not split or flake or peel off, or break away from the core 4 adjacent the line where the gum is severed or broken.

I preferably incorporate into the layer 4 of masticable material the same flavor as that with which the lozenge material is flavored but the flavor for the chewing gum which is relied upon to impart flavor to the gum is in the outer layers of lozenge material.

During the chewing of a piece of my improved gum, the outer layers or plies 2 and 3 of lozenge material do not break or crumble away, or flake off from the core or intermediate layer. The mastication of a piece of my improved gum effects a thorough intermingling of the confectionery material with the masticable material of the intermediate ply, and the soluble sugar comprising the outer plies 2, 3 is not immediately dissolved away from the masticable intermediate layer into the saliva of the mouth. It is worked into the masticable material, imparting to the masticable, insoluble content of my gum, the strong full, natural flavor contained in the lozenge confection.

My new and improved gum is practically impervious to weather conditions because the lozenge material is not hydroscopic or deliquescent and it protects the hydroscopic material of the intermediate layer from contact with the air. A wrapping of each piece in foil or waterproof paper is not required to prevent the piece of gum from becoming wet or moist and tacky. A wrapper may be used however to keep the piece of gum clean.

I am aware that there is on the market a type of chewing gum which is "candy coated" but those chewing gums are, generally speaking, packed in a pasteboard carton, as distinguished from a package of thin flat strips or layers of gum, bundled together by a wrapper. In shape they are drop-like or pillow-shaped with rounded corners and edges. This is because the coating of these drops or thick chunks of gum is effected by a panning process in a hot or warm pan containing melted sugar and the pieces are subjected to considerable attrition rolling over one another in the pan. They are thus rolled in the melted sugar until a thin protective coating of crystalline sugar envelopes the gum core. But this thin panned envelope or coating of sugar on such "candy coated" gums has its limits for carrying flavor and is not particularly adapted to constitute the main flavor carrying element of the piece of gum. The main flavor which such chewing gums have is that which has been incorporated into the masticable core in the ordinary manner. The thin candy coating is more for the purpose of protecting the gum core from contact with the atmosphere and for avoiding the necessity of wrapping the gum in tinfoil, than for constituting the flavor holding part of the gum. The panned candy shell so formed on such "candy coated" gums is not a lozenge confection having a consistency substantially like that of the core, but it is a crystalline sugar candy shell, built up of hot melted sugar, not well adapted either in quantity or quality to contain and retain the main flavor for the core nor to impart a full rich natural flavor to the core. It is brittle, breaks away from the core and does not work into or intimately mix with the core during the mastication of the gum.

Moreover a thin rectangular piece of chewing gum, of the shape of my core, cannot be provided with a coating or envelope of sugar by the panning process above referred to because the piece of gum must roll and tumble in the hot or warm melted sugar, and the thin flat pieces which form the subject-matter of my invention, could not be so tumbled in the pan. Moreover the panning process results in a piece of gum having rounded edges and rounded corners, due to the rolling and turning of the soft piece of gum in the melted sugar. If the thin rectangular piece which constitutes my masticable core, could be turned and rumbled and coated by the panning process, the finished piece of gum would have rounded corners and rounded edges. It would not have the well known thin flat rectangular sharp cornered shape that my finished piece of gum has and for which the popular demand is greatest.

In my improved gum, the flavored confection contains the substantial flavor for the entire piece, and is of such a character that substantially all the delicate and full fruit flavors, not now generally used in chewing gums, can be readily incorporated into the lozenge material, and by it imparted to the masticable portion of the gum. Even such flavors as peppermint, spearmint and wintergreen, are greatly improved when introduced into one or more layers of lozenge confection united as above described to a layer of chewing gum.

The invention herein described and claimed is also disclosed in a copending application, Serial Number 304,935, filed September 10, 1928.

Having thus described my invention, what I claim and desire to protect by Letters Patent of the United States is:

1. A thin flat rectangular stick or bar of chewing gum composed of a thin ply or layer of masticable material interposed between and inseparably united to two like thin slightly flexible plies or layers of flavored lozenge material, the material of the inner layer penetrating slightly into the material of the outer layers, and the main flavor for the chewing gum being in said layers of lozenge material.

2. A thin flat rectangular stick or bar of chewing gum composed of three plies of substantially equal thickness inseparably united, the intermediate ply being of masticable material having a relatively high insoluble content and the two outer plies being composed of lozenge confectionery, which is normally brittle when dry but which remains somewhat flexible when united to said intermediate layer, the main flavor for the chewing gum being in the said layers of lozenge material.

3. A thin flat rectangular stick or bar of chewing gum composed of three plies of substantially equal thickness inseparably unitarily united, the intermediate ply being of masticable material and the two outer plies being composed of smooth lozenge confectionery, which is normally brittle and not flexible when dry, the flavor for the chewing gum being in the said outer plies of lozenge material, and the materials of contacting plies penetrating slightly into each other at the plane of their juncture, whereby the said outer plies are rendered slightly flexible, when dry, and whereby, when said strip of chewing gum is broken or severed, the lozenge material adjacent to the severed or broken end does not chip off or separate from said intermediate ply.

4. The method of making chewing gum which consists in making a batch of chewing gum having a relatively high content of insoluble masticable material, and a batch of flavored plastic ductile lozenge dough which is normally brittle when dry, and rolling said batches separately into relatively thick sheets, then interposing a relatively thick sheet of said chewing gum material between two similarly thick sheets of said lozenge dough, then rolling the thick three-ply composite sheet so formed, thinner and thinner, at a temperature at which the ductility of the chewing gum material is substantially the same as that of said lozenge dough, until the thickness of the plastic three-ply base sheet, so formed is substantially that of an ordinary individual strip of chewing gum, thereby forcing the material of each ply slightly into the material of the adjacent ply at the planes of their contact with each other, said base sheet comprising a thin layer of chewing gum material covered on each side respectively with a thin layer of lozenge dough, then scoring said plastic base sheet into three-ply rectangular strips, each of the size and shape of an ordinary flat strip of chewing gum, and then allowing said scored base sheet to cool, said plies of lozenge dough being so intimately and permanently united to said ply of chewing gum material that they are slightly flexible, when cool and dry, and do not chip off, or break away or separate from said ply of chewing gum material when the piece of chewing gum, so made, is broken, or severed, or masticated.

5. The method of making chewing gum, which consists in preparing a batch of flavored lozenge dough, the plasticity and ductility of which is not substantially changed by variations in temperature, and which normally becomes brittle and inflexible when dry, and preparing a batch of chewing gum composed of the materials usually employed in the making of commercial chewing gums of good quality, and the ductility of which varies with the temperature and increases as the temperature rises, said last-mentioned batch being maintained at a temperature at which its ductility is substantially the same as that of said lozenge dough, superposing a relatively thick sheet of said chewing gum material upon a correspondingly thick sheet of said lozenge material, then placing a like thick sheet of lozenge material upon said sheet of chewing gum material, then forming a laminate base sheet by rolling under pressure said composite sheet thinner and thinner, down to the thickness of the finished piece of gum to be made therefrom, said rolling being effective to evenly reduce the thickness of said composite sheet as a whole, and to reduce the thicknesses of said plies of said composite sheet substantially alike, and to force the material of the contacting plies slightly into each other throughout their planes of contact, whereby there is imparted to said ply of lozenge confectionery, when dry, a slight flexibility, by the incorporation thereinto of the small amount of the material of the said ply of chewing gum material, and whereby the adherence of said plies to each other is made such that the lozenge confectionery will not chip or break away or separate from the said ply of chewing gum material when the finished cool piece of chewing gum, made therefrom, is severed or broken, and then dividing said base sheet so formed and in a plastic condition into a plurality of like individual pieces.

In witness whereof, I have hereunto set my hand this 7th day of September, 1928.

GILBERT B. MUSTIN.